United States Patent [19]

Hornberger et al.

[11] Patent Number: 4,917,960
[45] Date of Patent: Apr. 17, 1990

[54] POROUS COATED PRODUCT

[75] Inventors: Dennis A. Hornberger, Reading; Mark F. Mosser, Sellersville; Bruce G. McMordie, Feasterville, all of Pa.

[73] Assignee: Sermatech International, Inc., Limerick, Pa.

[21] Appl. No.: 918,531

[22] Filed: Oct. 14, 1986

Related U.S. Application Data

[63] Continuation-in-part of Ser. No. 566,514, Dec. 29, 1983, Pat. No. 4,617,056, Ser. No. 820,021, Jan. 21, 1986, and Ser. No. 624,924, Jun. 27, 1984, Pat. No. 4,793,968, which is a continuation of Ser. No. 454,473, Dec. 29, 1982, abandoned, and Ser. No. 886,906, Jul. 16, 1986.

[51] Int. Cl.⁴ ............................................. B22F 3/10
[52] U.S. Cl. .................................... 428/550; 428/552; 428/558; 428/560; 428/566; 428/622; 428/654

[58] Field of Search ............... 428/550, 622, 558, 560, 428/552, 566, 654

[56] References Cited

U.S. PATENT DOCUMENTS 3,677,721  7/1972  Elbert et al. .
4,698,269  10/1987  Narush, Jr. et al. ............... 428/552

FOREIGN PATENT DOCUMENTS 1030385  5/1966  United Kingdom .

Primary Examiner—Stephen J. Lechert, Jr.
Attorney, Agent, or Firm—Weiser & Stapler

[57] ABSTRACT

Porous coating for substrates especially metal substrates. The pores are created by the removal of a fugitive material. The coatings have useful numerous applications also for heat exchange, optical coating and non-slip. Products formed from the coating and a method of forming such products are also disclosed.

73 Claims, 5 Drawing Sheets

POROUS COATED PRODUCT

This is a continuation-in-part of pending patent application Ser. No. 566,514 now U.S. Pat. No. 4,617,056 entitled Thick Coating Compositions and Uni- and Polymodal Types, filed Dec. 29, 1983 in the names of Mark F. Mosser and Bruce G. McMordie; and of pending patent application Ser. No. 820,021 entitled Thick Coating Compositions of Unimodal Type, filed Jan. 21, 1986 in the names of Mark F. Mosser and Bruce G. McMordie; and of pending patent application Ser. No. 624,924 now U.S. Pat. No. 4,793,968. entitled Surface Modified Powder Metal Parts and Methods for Making Same, filed June 27, 1984 in the names of Mark F. Mosser and Bruce G. McMordie which is a continuation of application Ser. No. 454,473, filed Dec. 29, 1982, now abandoned; and of pending patent application Ser. No. 886,906 entitled Improved Coated Parts, Coating and Methods of Application, filed July 16, 1986 in the names of Mark F. Mosser and William J. Fabiny. All these patent applications are incorporated herein by reference.

The four above-referenced patent applications disclose (in one embodiment of the inventions) coatings constituted of mixtures of metal powders like aluminum. It is disclosed that another constituent of the mixture can be a polymeric resin which can be thermosetting or thermoplastic. Polymers which are illustrated include acrylics, polyesters, epoxies, polyamides, polyolefins, fluororesins, polyarylsulfones, polyarylene sulfides, polyimides, polyamide-imides, silicones, vinyls, urethanes, synthetic rubber elastomers, gums, and oligomers. The coating of these two first identified applications are highly dense and packed.

This patent application also relates to U.S. Patent No. 4,532,289 entitled Primer Coating Composition, issued in the names of Mark F. Mosser and William J. Fabiny on July 30, 1985.

This invention relates to a substrate, generally a metal substrate to which there is bonded a porous coating. The invention relates also to a method of forming such products. More specifically the invention relates to a metal product such as a metal sheet which is coated with a highly porous metal coating. The invention also relates to coating compositions for making the coated products, and to other embodiments which will become apparent hereinafter.

A further object of the invention is to provide an efficient heat transfer surface which has a through porous coating.

It is a still further object of the invention to provide such surfaces as may be used for various other applications where extensive surfaces are needed such as what is called for "optical coatings" which can reflect different wave-lengths, absorb light and cause infrared suppression.

It is a further object of the invention to provide roughened surfaces which have applications as non-slip coatings.

It is a noteworthy characteristic of the invention that the porosity in the coating is created by a fugitive or transient material which creates the porosity as this material is removed from the other constituents of the coating.

The coated products of the invention have numerous industrial applications. They are particularly useful in heat transfer applications. The coatings of the invention also have other useful applications, for instance, as optical coatings having large surfaces which can reflect different wave-lengths, absorb light and cause infrared suppression. They can be used for non-slip applications on surfaces where such characteristics are highly desired. The coatings are useful to make rough surfaces for bonding other coatings. The coated articles and coating have other practical and industrial applications which will become apparent to one skilled in the art.

The materials constituting the coating can also be used as such as a self-sustaining structure (without a base or substrate). As such they are useful as catalytic beds or barriers, and in numerous other applications where very extensive surfaces are called for.

In one of the important applications of the invention, the coated metal products are useful as heat exchangers. The products offer a highly effective way of transferring heat from a heated area to a fluid in contact with the coated product through the mechanism known as nucleate boiling. According to the most accepted theory of nucleate boiling as reported in the literature, irregularities or cavities (or interconnecting through pores) in the heat transfer surface known as nucleation sites trap minute amounts of vapor which form the nucleus of a bubble. It is known, for instance, that the efficiency of the heat transfer relates to the nature of the heated surface in contact with the liquid. Smooth supporting surfaces produce low heat transfer co-efficients on the boiling side. Low boiling heat transfer co-efficients often severely restrict the heat transfer capacity of the boiling device. In contrast to smooth boiling surfaces, roughened surfaces provide a porous boiling surface which is able to transfer to a boiling liquid large quantities of heat at much lower temperature differences than required in conventional heat exchange devices. As the bubbles rise in a continuous column from nucleation sites, they interrupt the boundary layer of super heated liquid and carry super heated liquid away from the hot-wall surface. Prior art has shown that the heat transfer rate and especially the boiling heat transfer rate increases in direct proportion to the number of active bubble column sites. See for instance, H. M. Kurihari and G. E. Meyers, "The Effect of Superheat and Surface Roughness on Boiling Co-Efficient", American Institute of Chemical Engineers Journal, Vol. 6, No. 1, pages 83–91 (1960).

The prior art indicates an awareness of the problem at least with respect to heat exchange surfaces and discloses several devices which attempt to improve the heat transfer efficiency. None of the art reviewed teaches or suggests the invention disclosed herein.

U.S. Pat. No. 4,359,086 to Sanborn et al deals with a heat exchange surface which has nucleate boiling cavities which are constituted by a plurality of helical fins formed on the outer surface of a metallic tube. A porous coating is flame-sprayed on the deformed portion of the fins. A preferred coating is constituted of oxidized aluminum particles which are flame-sprayed.

U.S. Pat. No. 3,990,862 to Dahl et al discloses a process for flame-spraying oxidized metallic particles onto a metal substrate to form a porous open celled coating. The patentees note that a porous coating per se does not effect a heat exchanger interface capable of promoting nucleate boiling. The coating or surface must have other certain physical requirements.

U.S. Pat. No. 3,384,154 to Milton discloses a method of thermally bonding a porous layer or coating to a heat exchanger apparatus for establishing a plurality of nucleation sites capable of promoting and sustaining nucleate boiling. As noted in U.S. Pat. No. 3,990,862 (above mentioned) there are several problems associated with the thermal bonding as by brazing, soldering, or sintering as is disclosed by Milton. Soldering and brazing as is known in the art are akin to each other in that they both involve uniting separate metallic parts, if necessary with a meltable alloy.

U.S. Pat. No. 4,358,485 to Kern et al discloses a method for forming a porous aluminum surface on an aluminum substrate using a potassium fluoroaluminate brazing flux in a particular critical ratio with an aluminum powder matrix component.

U.S. Pat. No. 4,179,911 to Saier et al discloses finned tubes for use in heat exchangers.

U.S. Pat. No. 4,182,412 also is concerned with finned heat transfer tubes. A rough surface is provided by tiny conductive particles such as graphite particles.

U.S. Pat. No. 3,696,861 discloses another approach where the surface is provided with a plurality of spaced apart fins to form cavities.

U.S. Pat. No. 3,607,369 to Batta discloses a method for forming a thin porous aluminum layer of interstitial and interconnected small pores on aluminum based material. The method uses a slurry of aluminum powder matrix, an elemental metal bonding component in powder form, an insoluble aluminum brazing flux and a vehicle, preferably an organic liquid.

U.S. Pat. No. 2,785,084 to Lundin et al relates to a coating of aluminum for iron and iron alloys.

U.S. Pat. No. 3,951,328 to Wallace et al deals with a method of joining metal surfaces using a flux which includes potassium fluoroaluminates.

U.S. Pat. No. 3,971,501 also deals with a brazing alloy and a powdered flux to produce a brazed joint.

U.S. Pat. No. 3,825,064 to Inoue discloses a heat exchanger constituted by compacting metallic particles forming the heat exchanged surfaces. The compaction involves electrical sintering with the particle-particle interface and the particle-substrate interface metallurgically homogenized to form a monolithic structure free from corrosion sites.

U.S. Pat. Nos. 4,258,783 to Albertson; 4,232,056 to Grant et al and 3,170,512 to Smith deal with various conventional heat exchangers. These patents illustrate, at least for the application to heat exchangers, the state of the art at the present. The disclosure of these patents are incorporated herein by reference.

A review of these patents indicates that although various attempts have been made to improve the efficiency of heat exchangers, none of these have disclosed or suggested the approach disclosed by the present invention.

The present invention deals with an article of manufacture which is especially suited for heat exchangers which includes a porous coating of bonded metal particles. The pores in the coating have been created by a fugitive (or transient) material which has been removed from the coating before or during its cure. The pores of the coating are generally interconnecting pores such that there is a tortuous yet open pathway from the surfaces of the coating to the surface of the substrate. In other applications the porosity need not be interconnected throughout. In one embodiment of the invention, the means for removing the fugitive material are thermal means; in another embodiment the means are chemical solvent means. Other means are suitable too.

In an article of manufacture of the invention, the porous coating which is cured includes a binder and pigments all of which are resistant to the means which are used for removing the fugitive material from the coating. The invention lends itself to the use of a variety of binders; typically a phosphate binder or a silicate binder (as herein further defined) may be used. The pigments are preferably metallic, ceramic, or polymeric powders or mixtures thereof which are resistant to the process for removing the fugitive material.

The invention disclosed also provides coating compositions for metal surfaces such as aluminum and iron alloys and ceramic surfaces such as alumina.

The invention also provides for an article of manufacture which includes a metal surface coated with the coating which includes a binder and optionally a thermoconductive pigment and encapsulated therein, particles of a fugitive material. When the fugitive material is extracted, removed or otherwise separated from the environment of the binder, pores are created in the place of the fugitive material.

The invention also provides for a method of manufacturing metal articles coated as described above.

These and other aspects of the invention will become evident from the disclosure which follows and by reference to the attached drawings.

Figure 1:
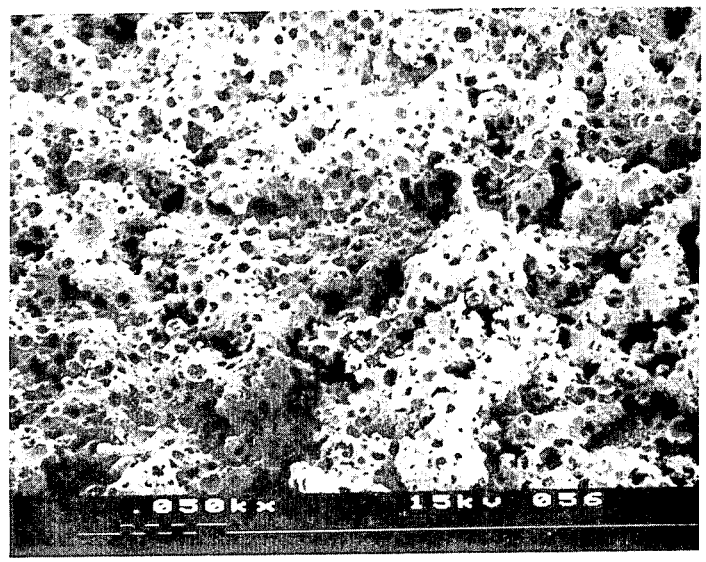
FIG. 1 shows an SEM photomicrograph of a coating of the invention (at 50X magnification, at a 45 degree angle).
Figure 2:
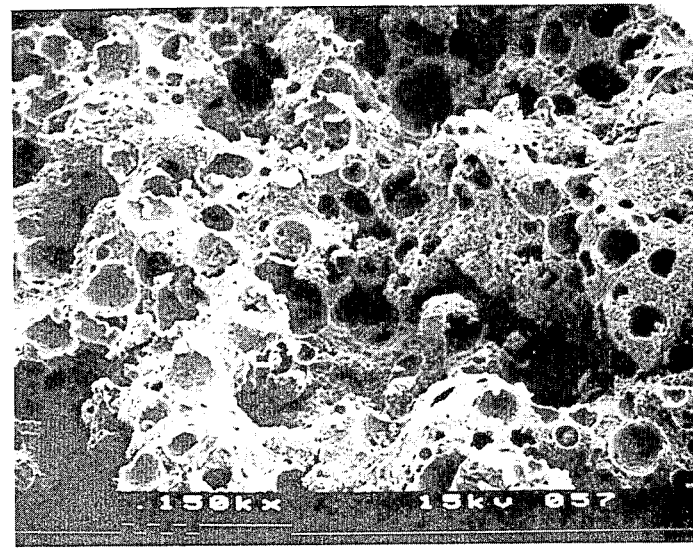
FIG. 2 shows an SEM photomicrograph of a coating of the invention (at 150X magnification, at a 45 degree angle).
Figure 3:
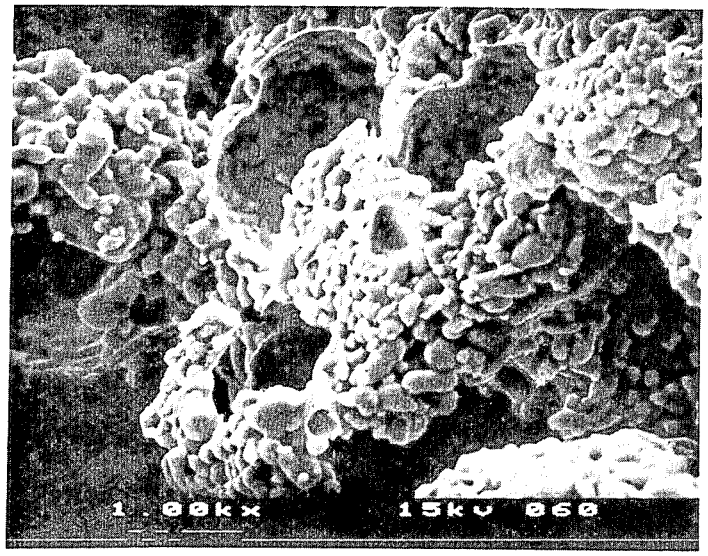
FIG. 3 shows an SEM photomicrograph f a coating of the invention (at 1000X magnification, at a 45 degree angle).
Figure 4:
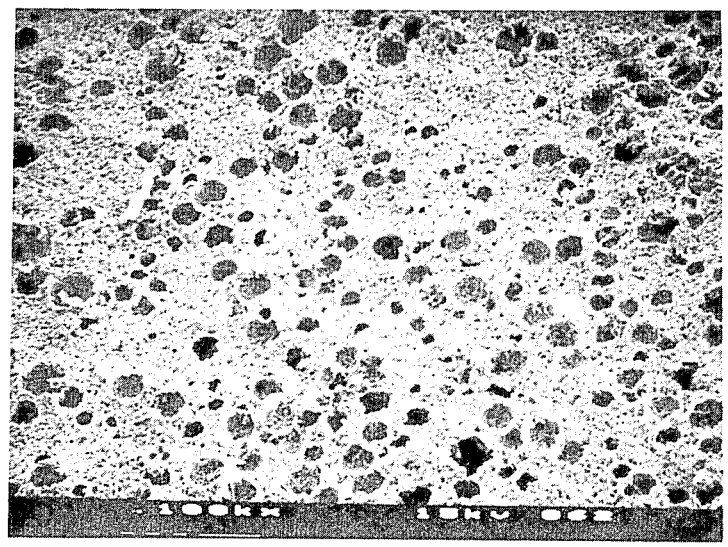
FIG. 4 shows an SEM photomicrograph of a coating of the invention (at 100X magnification, at a 45 degree angle).
Figure 5:
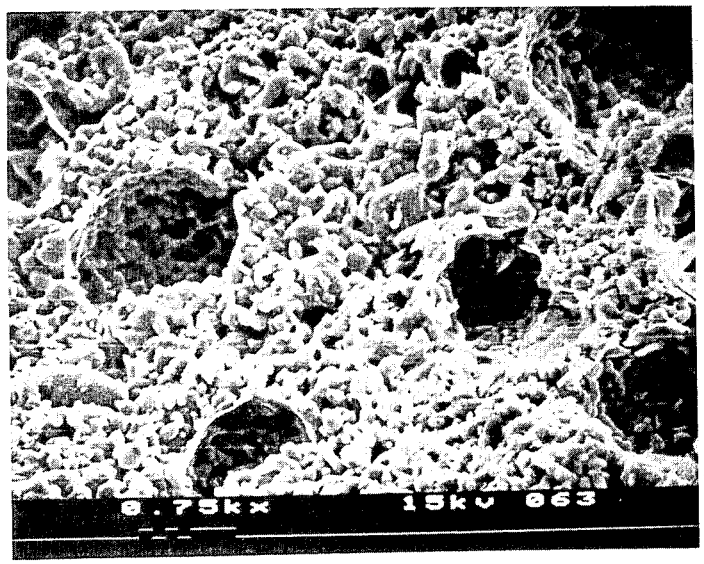
FIG. 5 shows an SEM photomicrograph of a coating of the invention (at 750X magnification, at a 45 degree angle).
Figure 6:
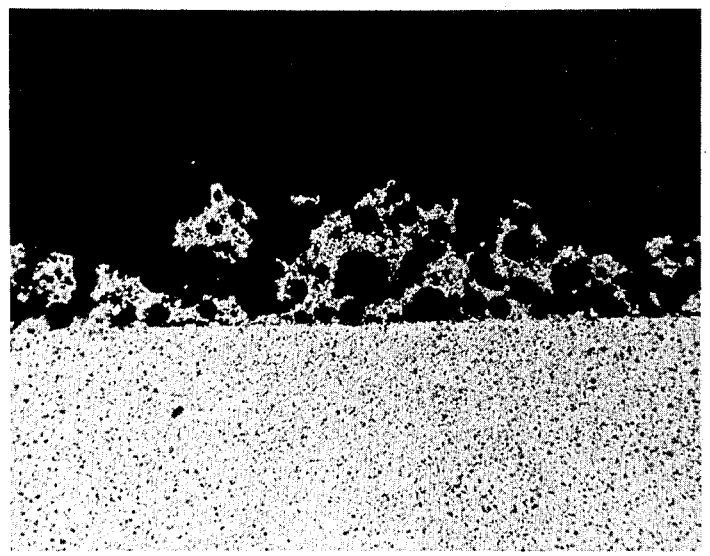
FIG. 6 shows a photomicrograph of a coating of the invention (at 50X magnification, transverse section).
Figure 7:
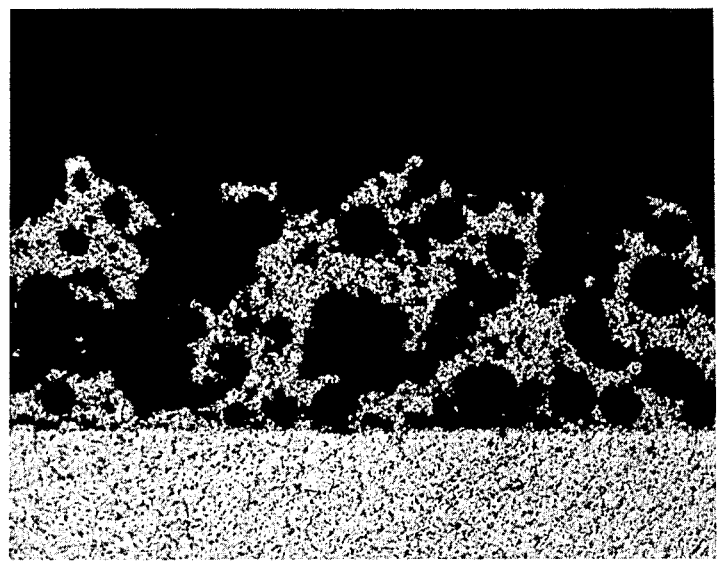
FIG. 7 shows a photomicrograph of a coating of the invention (at 100X magnifiation, transverse section).
Figure 8:
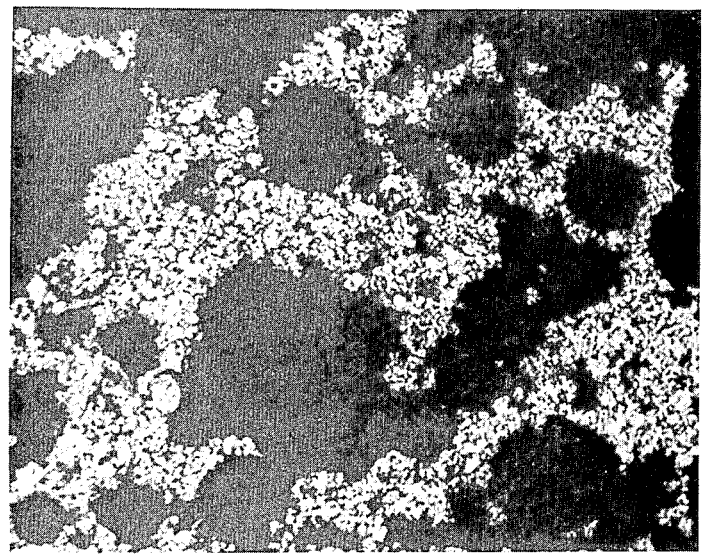
FIG. 8 shows a photomicrograph of a coating of the invention (at 200X magnification, transverse section).

The photomicrographs of FIGS. 1-3 are of the same coating as will be discussed hereinafter. FIGS. 4-5 show a different coating of the invention as is shown hereinafter.

FIGS. 6-9 are photomicrographs of transverse sections of the coating shown in FIGS. 1-3 at different magnifications including 50X, 100X, 200X and 400X for the respective Figures.

Figure 9:
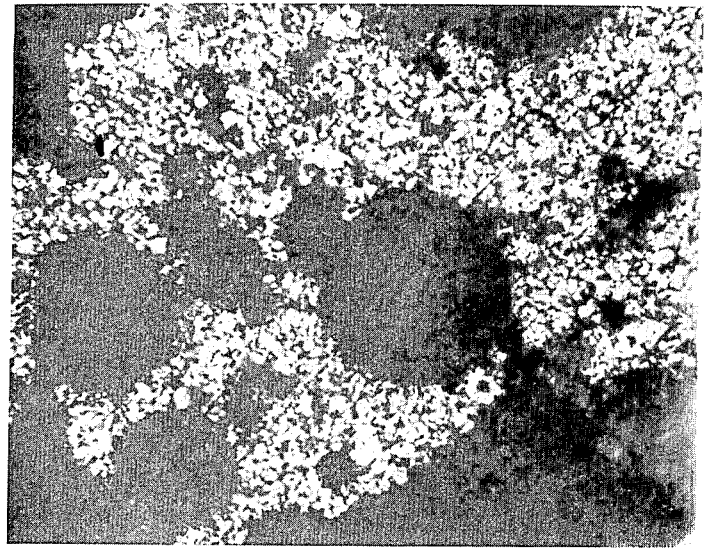
FIG. 9 shows a photomicrograph of a coating of the invention (at 400X magnification, transverse section).

In FIG. 9 (magnification 400X) aluminum particles which are part of the coating are visible.

In accordance with the invention the coating comprises a medium hereinafter called the "binder" which is generally an inorganic binder which contains the fugitive (or transient) material and optionally the metallic, ceramic and other nonfugitive pigments.

In accordance with the invention, the fugitive material is that material which is removable by any suitable means from the binder and from the other constituents of the coating. Any means which are conducive and in effect remove the fugitive material from its physical environment where it is located (or encapsulated or embedded) may be used in accordance with the invention. Preferably the means are thermal, that is, the application of heat to the coating causes the removal of the fugitive material. That material may be removed by heat from the binder by the decomposition, vaporizing, subliming or by other physical-chemical transformation. With the removal of the fugitive material there is created a pore in its place. The fugitive material, the nature of which will be described hereinafter, are generally powders of discrete particles. It is not necessary in accordance with the invention that all of the fugitive material be removed from the binder. When essentially all of the fugitive material is removed from the binder, a pore corresponding essentially to the size and shape of the particle is created. When less than all of the fugitive material is removed from the binder, the resulting pore is correspondingyy smaller.

When, in accordance with the invention thermal means are used to remove, for instance, to volatilize the fugitive material, the coating is exposed to a temperature high enough to cause the fugitive material to be removed. The temperature to which the coating is subjected may often be the same temperature at which curing and bonding of the coating to the metal surface is effectuated. The heat to which the coating will be subjected may effectuate the removal of the fugitive material first and then as higher temperatures are developed, cure the coating. Alternatively, the temperatures for curing and for the removal of the fugitive material may be virtually the same. Also curing may first be completed, then the fugitive material be removed by higher temperature or other means.

The fugitive materials which are useful in the invention include, but are not limited to, synthetic or natural polymeric materials, preferably synthetic polymers. In accordance with the invention it is highly preferred that the synthetic polymers be insoluble, inert and stable in the aqueous binder, whether it is an acid binder or an alkaline binder. Further, the synthetic polymer should be removable from the coating (which includes the binder) by any suitable means (such as thermal or chemical), preferably without leaving a significant residue in order to obtain cavities or pores of substantially the same size as the synthetic polymer particle. Preferably the polymer is in form of a particle. The polymers may be used in mixtures, i.e. more than one may be used if certain advantages are to be obtained thereby.

Typical polymers useful in the invention are polyvinylidene fluoride, vinyl lower alkyl esters, vinyl halides, polyacrylic and polymethacrylic acid and esters, sulfone polymers, polyimides, polyamides, acrylics, epoxy resins, polyesters, polyether ether, ketone, polyolefins, fluororesins, polyarylene sulfides, polyamide-imides, silicones, vinyls, urethanes, phenylene based resins, phenolics, natural or synthetic elastomers. The polymers may be thermosetting or thermoplastic. They may be homopolymers or copolymers.

Non-limiting examples of the sulfone polymers include polysulfones such as Udel P1700 or Mindel A-650, polyether sulfones such as Victrex 200P or polyarylsulfone. The polyimides include polyetherimide, for example Ultem 1000, thermoset polyimide, for example Novimide or Kerimid 601 and thermoplastic polyimides.

The polyamides, or nylons, include basic unmodified and modified nylons as well as homo- and copolymers. Other polymers include semicrystalline polymers such as Capron C-100 as well as amorphous polymers such as Trogamid-T and PA 7030. Polyamide-imide polymers include, for example, those available commerically under the Torlon trademark.

Acrylics include those produced from alkyl (especially lower alkyl), e.g. methyl methacrylate monomer as well as other homopolymers and copolymers with other acrylates or other copolymerizable monomers. Examples include Lucite, Plexiglas and Kydex 100.

Epoxy resins include DGEBA and related epoxies, aliphatic epoxies and multifunctional epoxy resins. Examples include Polyset EPC202, Fiberite E2748, and Novimide 700/55 hardener PR018 Flex.

Polyesters include alkyd polyester, aromatic polyesters such as the polyarylates or aromatic homopolyesters, for example Ekonol; thermoplastic polyester, for example polybutylene terephthalate (PBI), polytetramethylene terephthalate (PTMT); polyethylene terephthalate (PET); copolyesters such as PCTA and PETG copolyester; and unsaturated polyester. Examples include Celanex 3200, 3210, 3300, 3310, 3400, Kodar PETG6763, Gafite 16022, Valox 310, and Valox 310 SEO. Also included are thermoset polyesters such as Aropol 7241 and MR14042, MR12293, MR12311, MR13029 and MR14059.

Polyolefins include polyalkylenes such as polyethylene, polypropylene, polybutylene. The polyethylene (PE) includes ethylene copolymers. Examples include high and low density polyethylenes (LDPG, MDPE, HDPE), linear low density polyethylene (LLDPE), high molecular weight high density polyethylene (HMW-HDPG), and ultra high molecular weight high density polyethylene (UHMWPE). Other polyethylenes include those known as ionomers, for example those based on sodium or zinc salts of ethylene/methacrylic acid copolymers. Additional polyethylenes include ethylene acid copolymers, ethylene-ethylacrylate copolymers, ethylene-methylacrylate copolymers and ethylene-vinylacetate copolymers. Examples include Hostalen, GA7960, GB6950, GG7260, GF7740 F, GM5010 T2, GM7255B, GM7746, GM9255 F2, GR7255 P, GUR, Tenite polyethylene, and Marlex. The polybutylenes include Shell 0200; Duraflex 4101, 4103, 4121 and 4127. The polypropylenes include homopolymers, copolymers, and tripolymers. Examples include Tenite 4231, Tenite 5020, Shell 5225, 5520, 5524, 5530, 5820, 5824, 5114S, 5944S and 5984.

Fluororesins include those that contain no carbonhydrogen bonds in the polymer as well as those which contain some carbon-hydrogen and/or carbon-chlorine bonds. Examples include polytetrafluoroethylene, fluorinated ethylenepropylene copolymer, perfluoroalkoxy resin, ethylenetetrafluoroethylene copolymer, polyvinylidene fluoride, polychlorotrifluoroethylene, ethylene-chlorotrifluoroethylene copolymer and polyvinyl fluoride.

Polyarylene sulfides include polyphenylene sulfide polymers such as Ryton.

The vinyl polymers include polyvinyl and vinyl copolymers, for example polyvinyl chloride, polyvinyl acetate, polyvinyl alcohol, polyvinyl formal, polyvinyl butyral, polyvinyl fluoride, polyvinylidene chloride and polyvinylidene fluoride. Also included is polystyrene including polyparamethylstyrene, butadiene-styrene, styrene-acrylonitride and styrene-maleic anhydride resins.

Urethane polymers include polyurethane polymers such as those based on tlylene diisocyanate (TDI), methylene diphenyl isocyanate (MDI) or polymeric isocyanates (DMDI) as well as aliphatic diisocyanates. Examples include Pellethane 2102-90A and Pellethane 2103-90A.

The silicones include homopolymers and copolymers and are elastomeric or rigid in their final form. Other thermoplastic elastomers which are natural or synthetic rubber elastomers are also within the scope of the invention. These include styrene block copolymers, polyolefin blends and others as are known in the art.

A non-limiting disclosure and description of resins of the invention is found in *Modern Plastics Encyclopedia,* 1984–1985, McGraw Hill, incorporated herein by reference.

While the above-identified resins are favored embodiments of the invention, one skilled in the art could also use other fugitive materials which can be removed in accordance with the above disclosure. These materials may be used where less expensive materials are desirable. Conceivably such materials include natural polymeric materials such as cellulose based residues; corn cobs, bark, wood chips, etc.

Other suitable materials include inorganic materials which are removable from the binder in accordance with the above disclosure. Preferably are inorganic salts, which are soluble in organic solvents or in aqueous solvents at a pH which does not affect the binder. Other organic compounds which are pure substances or mixtures are usable if the substances in question have suitable particle size and are non-reactive with the binder solution.

In accordance with the invention, as has been described above, the fugitive material is removed from the binder in any convenient way. In a typical embodiment of the invention, the fugitive material is removed thermally before, during or after the curing of the binder takes place. The thermal removal can be degradation, vaporization, decomposition or burning of the fugitive material. Likewise, the fugitive material can be removed by solvent before, during or after the curing of the binder.

For instance, when it is desired to remove the fugitive material with a chemical solvent, the coated metal part with the dried but not yet cured coating containing the fugitive material is exposed to a solvent for the fugitive material for a time long enough to cause its removal as by dissolving the material from the dried binder. Illustratively, a fugitive material which is an acrylate or methacrylate resin particle may be removed by exposure and washing of the dried coating to a suitable ketone such as methyl ethyl ketone or acetone. The use of the chemical solvent method may be performed at room temperature or at elevated temperature if so desired.

Solvents which are useful depend on the nature of the fugitive material and include, for example, chlorinated and aromatic hydrocarbons such as methylene chloride, benzene, toluene and 1,1,1-trichloroethane. Other solvents such as ketones, particularly methyl ethyl ketone or acetone are also useful. These solvents are useful to remove a fugitive material which is soluble in the solvent. For example, a methacrylate resin is soluble in ketones such as methy ethyl ketone and acetone or in chlorinated hydrocarbons such as methylene chloride or trichloroethylene. The solubility characteristics of the resins of the invention are known to one skilled in the art.

In accordance with the invention it will be appreciated that the means for removing the fugitive material are not critical. What is desired is that the material be removed from the binder in any suitable fashion. One skilled in the art will be able, without undue experimentation, to select the means for removal of the fugitive material which are best suited under the circumstances in particular, the nature of the fugitive material, and of the binder.

What is needed in accordance with the invention is that a solvent be used which will dissolve the polymeric material, preferably without leaving an objectionable amount of residue, such as a film that would obstruct the pores. It is within the spirit of the invention that both thermal and chemical (e.g. solvents) means be used, in any sequence appropriate under the circumstances.

Thus it will be seen from the above disclosure that a large variety of different fugitive materials may be used. Preferred are the fugitive materials which are insoluble in the aqueous medium constituting the binder whether acidic or basic (like the phosphates or the alkali silicates). Preferably also the fugitive material is removable by heat treatment inasmuch as heat treatment is generally necessary for curing the coating. However, it should be recognized by one skilled in the art that other preferred fugitive materials may very well serve for different applications.

It can be appreciated that by judicious selection of material for the coating and the fugitive material considerable latitude in the manufacturing conditions or material is possible. In fact, the nature and volume fraction of porosity in the coating may be adjusted by varying the size and quantity of fugitive materials in the coating.

In accordance with the heat transfer aspects of the invention it is highly desirable that the coating porosity be interconnecting and be "through" porosity, that is, that the pores be open through the coating to the substrate. This will promote, when coating/substrates are "sandwiched" together as disclosed above and in the prior art, the efficient heat transfer for boiling a liquid and creating vapor bubbles that will readily separate from the surface.

For heat exchanger application it is highly desirable that the coating have an interconnecting porosity in the range from about 20 to 90%, preferably 40 to 80% and most preferably from about 40 to 60%.

The pore size of the coating for many heat exchanger applications may range from about 20 to about 60 microns, preferably from about 30 to 50 microns.

However, it is not necessary for other applications that the porosity be "through" porosity or totally interconnected porosity. Indeed there are applications where isolated voids are preferred and in which it is not desirable that the porosity be interconnecting porosity.

In accordance with the invention the greater the content of fugitive material in the binder, the greater the porosity. Accordingly, it is highly desirable that the binder solids and other pigments include a proportion of fugitive particles from about 20 to about 80% by volume of total coating solids, more preferably from 40 to 80%, and most preferably from 40 to about 60% by volume.

As has been disclosed above, a wide range of porosity can be achieved in the coating. In some applications it is desirable to have through porosity. Such a porous coating is created by a chromate/phosphate binder containing small aluminum particles (in the range from 5 to 10 microns) in mixture with a thermoplastic acrylic powder having an average particle size of about 100 microns. In this thermoplastic acrylic powder about 87% of the powder is between 53 and 150 microns in size. Pores are created as the acrylic powder is vaporized during the curing step.

It is to be noted that conventional coatings (without the fugitive material) generally have a certain amount of interconnecting porosity.

In accordance with the invention the binder—which will be discussed hereinafter—may contain additional particles which are metal particles or other thermoconductive pigment particles. The thermoconductive pigment particles may also be transition metal carbides, silicides, phosphides such as tungsten carbides, iron phosphates or iron oxides and other similar non-metals.

For certain applications, it is highly desirable that the binder combine metal particles or powders constituted of metal particles. Any metal particles may be used as is disclosed in the above-identified parent patent applications and in the prior art. Preferably the metal particles or their alloys are of the same metal as the base metal which is coated or are selected from a group of metals of high thermal conductivity.

In a preferred embodiment of the invention aluminum plates are coated with binders containing, in addition to the fugitive material, aluminum powders. The size of the particles constituting the aluminum powders may vary over a considerable range. For example, the aluminum powder may be spherical in shape and less than 4 microns in average equivalent spherical diameter as taught in U.S. Pat. No. 4,537,632 or be atomized aluminum powder with a 5-10 micron average particle size as taught by Allen in U.S. Pat. No. 3,248,251. In addition, a larger average size aluminum powder or a mixture of large and small powder as is disclosed in the above-identified patent application, Ser. No. 566,514 may be used. Likewise, the powders constituting the fugitive material need not be and generally are not, of the same diameter or particle size but fall within a range of sizes.

In accordance with the invention the binder may include mixtures of fugitive material, such as a resin, and a metal particle, such as aluminum, in the respective various ranges and proportions as disclosed in the above-identified pending patent application, Serial No. 566,514, and as disclosed in pending patent application, Serial No. 820,021. Large or small cavities will be created depending on the size of the fugitive material. If it is desired, fugitive material of different sizes may be classified in the coating so that the sizes of the pores will be increasing (or decreasing) from one face of the coating to the other.

However it will be noted in accordance with the invention, that it is not necessary to have a metal particle as part of the binder. However, where metal pigments are used in conjunction with the fugitive material, then heated at a curing temperature of about 900°-2100° F., the coating becomes electrically conductive and thermally conductive. When this thermal treatment is carried out in a non-oxidizing environment, the metal powder can fuse to form a porous, metallurgically bonded layer in accordance with U.S. Patent Application Ser. No. 624,924. This is a highly desirable characteristic which is impartable to the coatings of the invention.

It is also contemplated within the invention that the porous coating can be made "free standing". Such structure is obtained by forming the porous coating on a support, and then removing the support by thermal, chemical or physical means. The "free standing" porous structure can then be used, for example, as a filter, boiling or catalytic layer.

The medium which contains the fugitive material and optionally the metal particles, in accordance with the invention can be a variety of liquids which for the purpose of this invention are generally referred to as "binders". These binders may be of the "phosphate type" binders i.e. acid aqueous phosphate solutions. These generally have a low pH such as in the range of about 0 to about 4.0. Such suitable phosphate binders are disclosed in copending patent application (Ser. No. 886,906), entitled Improved Coated Parts, Coating and Methods of Applications. That patent application is incorporated herein by reference.

It may be noted that unlike the resins used in that invention, the resins used herein are fugitive and create the pores of the coating, as was explained above. In the above referenced patent application, the resin is part of the coating and/or does not create pores in the coating.

Another class of suitable binders useful in the present invention comprises phosphate ions and chromate and/or molybdate ions. A variety of such phosphate binders are known; for instance, Kirk and Othmer, *Encyclopedia of Chemical Technology*, 2nd ed., Vol. 13, Interscience Publishers, John Wiley & Sons, Inc., 1969 (pages 292-303), describes phosphate and chromate coatings. The United States patent literature describes coating solutions or dispersions for protective coatings of metals, which compositions are suitable for as binders for use herein. Such compositions are disclosed by Allen (U.S. Pat. No. 3,248,251); Brumbaugh (U.S. Pat. No. 3,869,293); Collins (U.S. Pat. No. 3,248,249); Wydra (U.S. Pat. No. 3,857,717); Boies (U.S. Pat. No. 3,081,146); Romig (U.S. Pat. No. 2,245,609); Helwig (U.S. Pat. No. 3,967,984); Bennetch (U.S. Pat. No. 3,443,977); Hirst (U.S. Pat. No. 3,562,011) and others. These disclosures are incorporated herein by reference. These binders are acid binders.

Other binders suitable for this invention are silica-containing organic or inorganic liquids. For instance, useful binders are water-soluble alkali metal silicates, like potassium and sodium silicates. The silicates may also include alkyl (e.g. lower alkyl) silicates, like ethyl silicates. Other useful binders include the lithium silicates, like lithium polysilicate. Other suitable binders are silica sols, like colloidal silica, sold under the trade names of Nalcoag, Ludox, Nycol, etc. Boehmite alumina dispersions are also suitable.

Other useful binders may include organic binders like silicones, phenolic resins in which case the fugitive material should not be removed by the means which remove the binder, such as heat or solvent. As stated above, the binder material is resistant to the means for removing the fugitive material.

The silicate binders are generally basic in pH, that is, form a solution or dispersion which has a pH in the alkaline pH range of 8-13. However, the pH of silica and silicate binders which can be used in compositions of the invention varies from slightly acid to highly alkaline, e.g. pH 3.5-13. The pH can be within this range in the binder/pigment mixture. The pH, however, is important to consider since certain fugitive materials may be acid or alkali sensitive and react or dissolve. The means for removing the fugitive material should not adversely affect the binder. For instance, if a fugitive material is an acrylic (or methacrylic) resin which is known to be soluble in ketones, the binder is selected to be resistant to ketones, and an alkyl silicate type binder would not be selected. Similarly, an alkali silicate might be dehydrated and precipitated by addition of a ketone to an uncured coating layer.

In accordance with the invention the binders which include the fugitive material may contain other pigments like metal powders, ceramic oxide, and/or other resins. Such additional constituents are known in the prior art and in the above-referred to pending patent applications.

It should be noted in accordance with the invention, that in addition to the fugitive materials there may be used another resin which resin is not fugitive under the conditions to which the fugitive material is exposed for its removal from the coating. Such resins are disclosed for instance, in pending application (Ser. No. 886,906).

A very desirable binder composition which includes a nonfugitive resin in addition to the fugitive material in accordance with the invention is a binder which comprises (in addition to the phosphate chromate) a fluororesin and an acrylic resin. As the coating is exposed to a temperature of about 700° F. to cause curing of the coating, the fugitive material (in this case acrylic particles) is "burned out" and removed from the coating. The film which is formed is a suitable fluororesin primer which has excellent adhesion and large interlocking surface. This is an illustration of the aspect of the invention where an insoluble resin is used which is resistant to the curing temperature at which the fugitive material is removed or volatilized from the coating. Other similar compositions may readily be prepared by one skilled in the art.

In the process of the preparation of the coated article of manufacture of the invention the binder would generally be prepared, such as a binder containing phosphoric acid and chromic acid. While mixing, and following procedures which are known in the art, there is added the metal powder such as aluminum powder and the fugitive material such as the acrylate resin. This aqueous coating composition is thoroughly mixed and applied to the surface to be coated by any desired method such as by dipping, spraying (gun-spraying) or any other suitable method known in the art. If certain parts of the metal sheet are not to be coated, they will be masked in accordance with methods also known.

Generally it is advisable that the metal sheet such as an aluminum sheet be thoroughly cleaned and be given the usual surface preparation as by vapor degreasing or by thermally degreasing, by heating at 650° F.±25° F. for 30 minutes. It is also common to grit-blast with 80–120 mesh aluminum oxide grit at 20–30 psi with a pressure blaster and then remove residual grit.

The applied coating may be air-dried at a suitable temperature such as 175° F. for 15 minutes and then cooled to ambient temperature. The coating application may be repeated on the dried coating as is desired or considered necessary. After having dried the coating, the curing of the coating and the removal of the fugitive material (if it is thermally removed), is then carried out.

Generally a curing temperature in the range of 300° F. to about 1500° F. for an adequate time to effectuate curing at for instance, 30 minutes is quite satisfactory, preferably the curing temperature of 650° F.±25° F. for about 30 minutes is preferable. This is especially so for phosphate binders which contain acrylate or methacrylate resin particles as the fugitive particle.

As described above, any metal or its alloy or any metal-based material or sheets may be coated with the coating of the invention. For heat exchangers, sheets made of aluminum or aluminum alloy are highly desirable. The thickness of the aluminum sheet may be any thickness desired. Other metal aluminum sheets which have been coated in accordance with the invention have a thickness of approximately 0.072 inches and other sheets have a thickness of approximately 0.005 to 0.200 inches. It is evident that depending on the application desired the metal sheet may have different thicknesses and, of course, sizes and shapes. Coating thickness may vary from about 0.001 inches to about 0.100 inches depending on the application. For certain applications a thickness of about 0.015 inches±0.002 inches is desirable.

In the manufacture of heat exchangers such sheets are normally bonded to each other to form a composite or stack of metal sheets. The sheets are bonded by brazing at suitable temperatures such as 1150° F. by methods known in the prior art.

Heat exchangers constituted of panels made in accordance with the invention exhibit remarkable high heat-transfer efficiency.

The following Examples which are illustrative of the invention are not intended to be a limitation thereof. It will be evident to one skilled in the art that variations can be made without departing from the spirit of the invention.

EXAMPLE 1

An aqueous acidic binder is prepared by mixing the following ingredients:

| BINDER A | |
|---|---|
| 1683 gm | Deionized water |
| 151.5 gm | Magnesium oxide |
| 192 gm | Chromic acid |
| 780 gm | 85% Phosphoric acid |

The binder is thoroughly mixed on a dispersator for adequate time to achieve complete mixing and then blended as follows.

| | |
|---|---|
| 2153 ml | Binder A |
| 47 ml | Deionized water |
| 1577 gm | Aluminum powder (Screen −325 mesh) |

The components of the aqueous binder are thoroughly mixed and there are added 1,410 gm of acrylic powder (Lucite, grade 4F).

The acrylic powder is thoroughly mixed with the liquid ingredients. The liquid composition has a pH in the range of 2.15 to 2.25, a viscosity of 11.7 to 12.2 seconds, (#3 Zahn cup), a specific gravity of 1.36. The percent solids content (by weight) at 350° F. is 64.6 and the percent solids content at 850° F. is 41.0.

The acrylic resin Lucite, is a product of DuPont de Nemours & Company. The methylmethacrylate acrylic resin is a water white transparent thermoplastic granular powder. It has the following sieve analysis.

| +100 mesh | 5.9 (% by weight) |
|---|---|
| −100 +200 mesh | 54.2 (% by weight) |
| −200 +270 mesh | 33.1 (% by weight) |

| | |
|---|---|
| −270 +325 mesh | 3.2 (% by weight) |
| −325 mesh | 3.6 (% by weight) |

Aluminum sheets to be coated (30×80×0.072 inches in dimension) are vapor degreased. The sheets may also be thermally degreased by heating to 650°±25° F. for 30 minutes. It is advantageous to prepare the surface of the aluminum sheet. One side of the aluminum sheet is grit blasted with virgin 90–120 mesh alumina grit at 20–30 psi with a pressure blaster and the residual grit is removed. Parts that are not to be surface treated are masked.

The aluminum sheets are gun sprayed with the aqueous coating composition prepared above to a smooth wet coat to the entire surface.

The surface is then air dried at 175° F. for 15 minutes and cooled to ambient temperature. An additional layer of the coating is then applied. The wet coating is then air dried at 175° F. for 15 minutes and then cured at 650°±25° F. for 30 minutes. Additional coats are applied and cured using the same procedure.

The sheets (four) are then vacuum brazed at about 1150° F. to combine the sheets in a layered structure.

Inspection of the individual sheets show the pore size to be approximately 30–50 microns. The pores are internally interconnected throughout. The total porosity of the coating is approximately 50–60%.

The coated sheets have a remarkably high heat transfer efficiency superior to that of conventional products.

Scanning electron micrographs (SEM) were taken of this coating at various angles and levels of magnification. These photomicrographs are FIGS. 1–3. FIG. 1 shows a SEM photomicrograph of the coating at 50X magnification at a 45 degree angle to the coating.

FIGS. 2–3 show SEM photomicrographs of the coating at 150X and 1000X magnifications respectively at a 45 degree angle to the coating.

FIGS. 6–9 show optical photomicrographs of transverse sections of the coating taken at 50X, 100X, 200X and 400X magnifications for the respective Figures. The mounts were epoxy vacuum impregnated so that proper mounting and polishing could be done. In FIG. 9, the aluminum particles are visible.

EXAMPLE 2

A coating was prepared by mixing the following ingredients.

| | |
|---|---|
| 500 ml | Potassium silicate solution, $SiO_2/K_2O = 2.5$, Density - 10.6 lbs/gal. (Kasil #1, PQ Corp.) |
| 500 ml | Deionized water |
| 800 gm | Aluminum powder, 5–10 μm average particle size |
| 700 gm | Acrylic granular thermoplastic resin (Lucite grade 4F) |

The coating was prepared by low shear propeller mixing; then applied to degreased grit blasted aluminum plates. The coating was dried 4 hours at 75° F. and thermally treated for 2 hours at 975° F. to produce an excellent heat transfer surface.

FIGS. 4 and 5 show SEM photomicrographs of the coating of Example 2 at 100X and 750X magnifications respectively at a 45 degree angle to the coating.

Alternatively, the dried coating was vapor degreased in 1,1,1-trichloroethane for 2 hours to dissolve the resin particles and produce the porous, heat transfer surface.

EXAMPLE 3

The following binder dispersion was made:

| BINDER 3 | |
|---|---|
| 890 ml | deionized water |
| 6 ml | concentrated nitric acid |
| 90 gm | boehmite alumina (Catapal SB Conoco Chemicals) |

The ingredients were mixed on a low shear propeller mixer until the alumina was dispersed. After dispersion the binder dispersion was a water-thin translucent liquid.

The following coating composition was made:

| | |
|---|---|
| 900 ml | Binder 3 |
| 40 gm | Polypropylene powder, −100 mesh Armstrong PP11000-N |
| 14 gm | Polyethylene powder, Micro Powders MPP-620XF |
| 0.4 gm | Fluorosurfactant FC-95, 3M Company |

The ingredients were mixed on a high speed mixer for 15 minutes, then spray applied to an alumina block. The block was heated to 500° F. to form the coating and volatilize the polyolefin pigments to create a porous structure. The coated block was dipped into a dilute platinum salt solution, then heated to 450° F. for 30 minutes to create a catalytic surface.

Instead of platinum, any other noble metal may be used to create an excellent catalyst structure.

EXAMPLE 4

A coating was prepared by mixing the following ingredients.

| | |
|---|---|
| 100 ml | Sodium silicate solution $SiO_2/Na_2O = 2.9$, weight/gallon = 12.3 lbs, "K" silicate (PQ Corporation) |
| 50 ml | Deionized water |
| 50 gm | Aluminum atomized powder, 5 μm average particle size |
| 80 gm | Aluminum atomized powder, −325 mesh Alcan MD-101 |
| 40 gm | Acrylic resin, 5–20 μm particle size |

The coating composition was mixed by low shear stirring and spray applied to stainless steel disks. After drying, the disks were heated to 750° F. for 2 hours to decompose the acrylic resin. The resulting porous structure is a suitable abradable seal material.

EXAMPLE 5

A coating was prepared by mixing the following ingredients.

| | |
|---|---|
| 500 ml | Binder A (Example 1) |
| 250 ml | Polytetrafluoroethylene dispersion (T-30, DuPont) |
| 60 gm | Polytetrafluoroethylene powder 3–4 μm average particle |

| | |
|---|---|
| 150 gm | size (Hostaflon TFVP 9202)<br>Acrylic resin (Lucite grade 4F) |

The coating composition was made by low speed propeller mixing of the ingredients. The composition was spray applied to steel panels, air dried, then cured at 700° F. for 1 hour. The cure temperature fused the PTFE into a film embedded in the chromate/phosphate binder matrix. The acrylic resin decomposed creating a porous, rough, high surface area primer suitable for bonding PTFE coatings.

EXAMPLE 6

A coating was prepared by mixing the following ingredients.

| | |
|---|---|
| 500 ml | Potassium silicate solution $SiO_2/K_2O$ ratio 2.5, Density 10.6 lbs/gal (Kasil #1, PQ Corp.) |
| 300 ml | Distilled water |
| 600 gm | Cobalt oxide ($Co_3O_4$) |
| 250 gm | Polyphenylene sulfide resin (V-1 grade - Phillips Petroleum) |

The coating was applied to sheet steel panels and air dried for 24 hours. The coating was then heated to 1000° F. for 12 hours to decompose the polyphenylene sulfide. The coating showed excellent optical properties, i.e. the capacity to absorb infrared light.

Although preferred embodiments of the invention have been described it is contemplated that modification can be made and that some features be added or omitted without departing from the spirit and scope of the invention.

We claim:

1. An article of manufacture suited for heat exchange which includes a porous coating in which the pores have been created by the removal of a fugitive material, which article comprises a metal surface coated with a porous coating which comprises a cured inorganic binder which is resistant to the removal of the fugitive material, the coating including interconnecting pores open to the surface of the coating and to the metal surface which pores have been created by the removal from the coating of particles of a fugitive material.

2. The article of manufacture of claim 1 wherein the porous coating is cured thermally.

3. The article of manufacture of claim 1 wherein the fugitive material is removable by means selected from the group consisting of thermal means and chemical solvent means.

4. The article of manufacture of claim 1 wherein the binder is a thermally cured phosphate binder.

5. The article of manufacture of claim 1 wherein the binder is a thermally cured potassium silicate binder.

6. The article of manufacture of claim 4 wherein the phosphate binder is constituted of phosphate and an ion selected from the group consisting of chromate and molybdate.

7. The article of manufacture of claim 6 wherein the fugitive material is a synthetic acrylate or methacrylate resin.

8. The article of manufacture of claim 2 wherein the binder is a phosphate binder constituted of phosphate and an ion selected from the group consisting of chromate and molybdate and the through interconnecting porosity of the coating is in the range of about 40 to about 80 percent.

9. The article of manufacture of claim 8 wherein the porosity is in the range of 40 to about 60 percent.

10. The article of manufacture of claim 7 wherein the size of the pores is not uniform.

11. The article of manufacture of claim 10 wherein the pore size ranges from about 20 to about 60 microns.

12. The article of manufacture of claim 11 wherein the pore size ranges from about 30 to about 50 microns.

13. The article of manufacture of claim 8 wherein the binder includes particles of a thermoconductive pigment.

14. The article of manufacture of claim 13 wherein the thermoconductive pigment is aluminum particles.

15. The article of manufacture of claim 1 wherein the binder is a phosphate binder constituted of phosphate and radicals selected from the group consisting of chromate and molybdate, and the binder includes aluminum particles, the fugitive material is a polymethyl methacrylate resin of particle size ranging from about 50 to about 150 microns and an average size of about 100 microns, and the interconnecting through porosity is in the range of about 40 to about 60 percent, which article of manufacture is an aluminum sheet.

16. The article of manufacture of claim 15 which comprises a multiplicity of coated sheets which are brazed to each other forming a layered article.

17. The article of manufacture of claim 16 which comprises sheets of a thickness of approximately 0.072 inches.

18. The article of manufacture of claim 16 wherein the coating of each aluminum sheet is in the range of about 13 to 17 mils thick.

19. The article of manufacture of claim 17 wherein the thickness of the coating is about 15 mils.

20. The article of manufacture of claim 18 which is thermally conductive.

21. The article of manufacture of claim 15 wherein the average size of the aluminum particles is in the range of about 5 to about 10 microns.

22. The article of manufacture of claim 15 wherein the aluminum particles are smaller than the fugitive particles.

23. The article of manufacture of claim 1 wherein the binder also includes a synthetic polymer which is not fugitive at the temperature at which the fugitive material is removed, and which synthetic polymer essentially does not contribute to the creation of the porosity.

24. The article of manufacture of claim 23 wherein the synthetic polymer is polytetrafluoroethylene.

25. An article of manufacture suited for heat exchange which comprises an aluminum surface coated with a porous coating which comprises a cured inorganic binder of phosphate and radical selected of the group consisting of chromate or molybdate and aluminum particles, the coating including interconnecting pores open to the surface of the coating and to the aluminum surface, which pores have been created by particles of a polymethyl methacrylate thermoplastic which volatilized at below or above the temperature at which the binder has been cured.

26. An article of manufacture suited for heat exchange which comprises a metal surface coated with a coating which comprises a cured inorganic binder containing a thermoconductive pigment and particles of a fugitive material encapsulated in the coating, which fugitive material is removable from the coating, thereby creating pores in place of the fugitive material.

27. The article of manufacture of claim 26 wherein the proportion of fugitive particles in the coating is high enough to create, upon their removal, interconnecting pores throughout the coating.

28. The article of manufacture of claim 26 wherein the fugitive material is removable by means selected from the group of thermal means and chemical solvent means.

29. The article of manufacture of claim 26 wherein the coating comprises aluminum powder.

30. The article of manufacture of claim 29 wherein the particles of the aluminum powder exceed the size of the particles of the fugitive material.

31. The article of manufacture of claim 29 wherein the particles of the aluminum powder are smaller than the size of the particles of the fugitive material.

32. The article of manufacture of claim 26 wherein the coating is heat curable.

33. The article of manufacture of claim 32 wherein the temperature at which the coating is cured is about 650°+250° F. the temperature range being below the temperature at which the fugitive material is removed from the cured coating.

34. A porous structure having a first and second surface in which structure pores have been created by removal of a fugitive material, the structure comprising a heat cured inorganic binder resistant to the removal of the fugitive material and pores created by the removal of the fugitive material, the pores being interconnecting and open to the first and second surface of the structure.

35. The structure of claim 34 wherein the binder is a phosphate binder constituted of phosphate and ions selected from the group consisting of chromate and molybdate.

36. The structure of claim 34 wherein the fugitive material is a synthetic polymeric material which is insoluble and inert.

37. The structure of claim 36 wherein the fugitive material is a synthetic acrylic or methacrylate resin.

38. The structure of claim 34 and a support therefor.

39. The structure of claim 38 wherein the support is metal.

40. The structure of claim 38 wherein the support is ceramic.

41. An article of manufacture which includes a porous coating in which the pores have been created by the removal of a fugitive material, which article comprises a metal surface coated with a porous coating which comprises a cured inorganic binder which is resistant to the removal of the fugitive material, the coating including interconnecting pores open to the surface of the coating and to the metal surface, which pores have been created by the removal from the coating of particles of a fugitive material.

42. The article of manufacture of claim 41 wherein the fugitive material is removable by means selected from the group consisting of thermal means and a chemical solvent means.

43. The article of manufacture of claim 41 wherein the fugitive material is a synthetic acrylate or methacrylate resin.

44. The article of manufacture of claim 41 wherein the binder is a phosphate binder constituted of phosphate and an ion selected from the group consisting of chromate and molybdate and the through interconnecting porosity of the coating is in the range of about 40 to about 80 percent.

45. The article of claim 41 wherein the size of the pores is not uniform.

46. The article of claim 44 wherein the binder includes particles of a thermoconductive pigment.

47. The article of manufacture of claim 46 wherein the thermoconductive pigment is aluminum particles.

48. The article of claim 47 wherein the binder is a phosphate binder constituted of phosphate and ions selected from the group consisting of chromate and molybdate, and the binder includes aluminum particles, the fugitive material is a polymethyl methacrylate resin of a particle size ranging from about 50 to about 150 microns and an average size of about 100 microns, and the interconnecting through porosity is in the range of about 40 to about 60 percent, which article of manufacture is an aluminum sheet.

49. The article of manufacture of claim 48 which comprises a multiplicity of coated sheets which are brazed to each other forming a layered article.

50. The article of manufacture of claim 48 wherein the coating of each aluminum sheet is in the range of about 13 to 17 mils thick.

51. The article of manufacture of claim 50 which is thermally conductive.

52. The article of manufacture of claim 48 wherein the average size of the aluminum particles is in the range of about 5 to about 10 microns 53. The article of manufacture of claim 41 wherein the binder also includes a synthetic polymer which is not fugitive at the temperature at which the fugitive material is removed, and which synthetic polymer essentially does not contribute to the creation of the porosity.

54. An article of manufacture which comprises an aluminum surface coated with a porous coating of a cured inorganic binder which comprises phosphate and ions selected of the group consisting of chromate or molybdate and aluminum particles, the coating including interconnecting pores open to the surface of the coating and to the aluminum surface, which pores have been created by particles of a polymethyl methacrylate thermoplastic which volatilized at, below or above the temperature at which the coating has been cured.

55. An article of manufacture which comprises a metal surface coated with a coating which comprises a cured inorganic binder containing a thermoconductive pigment and particles of a fugitive material encapsulated in the coating, which fugitive material is removable from the coating, thereby creating pores in place of the fugitive material.

56. The article of manufacture of claim 55 wherein the proportion of fugitive particles in the coating is high enough to create, upon their removal, interconnecting pores throughout the coating.

57. The article of manufacture of claim 55 wherein the coating comprises aluminum powder.

58. An article of manufacture which includes an optical reflective porous coating having pores open to the surface to reflect different wave-lengths, absorb light and cause infrared suppresiion, in which coating the pores have been created by the removal of a fugitive material, which article comprises a metal surface coated with the porous optical coating which comprises a cured inorganic binder which is resistant to the removal of the fugitive material, the coating including interconnecting pores open to the surface of the coating and to the metal surface, which pores have been created by the removal from the coating of particles of the fugitive material.

59. The article of claim 58 wherein the metal surface is steel.

60. The article of manufacture of claim 58 wherein the binder is a phosphate binder constituted of phosphate and ions selected from the group consisting of chromate and molybdate, and the binder includes aluminum particles, the fugitive material is a polymethyl methacrylate resin of particle size ranging from about 50 to about 150 microns and an average size of about 100 microns, and the interconnecting through porosity is in the range of about 40 to about 60 percent, which article of manufacture is an aluminum sheet.

61. The article of manufacture of claim 58 which comprises an aluminum surface coated with a optical reflective porous coating which has large surfaces to reflect different wave-lengths, absorb light and cause infrared suppression, which coating is a cured inorganic binder which comprises phosphate and ions selected of the group consisting of chromate or molybdate and aluminum particles, the coating including interconnecting pores open to the surface of the coating and to the substrate, which pores have been created by particles of a polymethyl methacrylate thermoplastic which volatilized at, below or above the temperature at which the coating has been cured.

62. The article of manufacture of claim 58 wherein the binder includes a metal.

63. The article of manufacture of claim 62 wherein the metal is aluminum.

64. The article of manufacture of claim 58 wherein the binder includes a ceramic material.

65. The article of manufacture of claim 64 wherein the ceramic material is cobalt oxide.

66. An article of manufacture which includes a non-slip, rough porous coating in which the pores have been created by the removal of a fugitive material, which article comprises a metal surface coated with a rough porous coating which comprises a cured inorganic binder which is resistant to the removal of the fugitive material, the coating including interconnection pores open to the surface of the coating and to the metal surface, which pores have been created by the removal from the coating of particles of the fugitive material.

67. The article of manufacture of claim 66 which comprises an aluminum surface coated with a thermally cured non-slip rough porous coating which comprises phosphate and ions selected of the group consisting of chromate or molybdate and aluminum particles, the coating including interconnecting pores open to the surface of the coating and to the aluminum surface, which pores have been created by particles of a polymethyl methacrylate thermoplastic which volatilized at, below or above the temperature at which the coating has been cured.

68. The article of claim 65 wherein the coating is an abradable seal.

69. The article of claim 65 wherein the metal surface is steel.

70. The article of claim 41 wherein the coating is a primer.

71. The article of claim 41 wherein the metal surface is steel.

72. The article of claim 41 wherein the fugitive material is a synthetic polymeric material which is insoluble and inert.

73. The article of claim 72 wherein the fugitive material is polyphenylene sulfide.

* * * * *